United States Patent
Smeathers et al.

(10) Patent No.: US 6,929,114 B1
(45) Date of Patent: Aug. 16, 2005

(54) CROSSOVER CONVEYOR SYSTEM

(75) Inventors: Jeffrey Allan Smeathers, Plainfield, IN (US); Howard Paul Carlson, Orleans, IN (US); David Wayne King, Santa Claus, IN (US)

(73) Assignee: C&M Conveyor, Inc., Mitchell, IN (US)

( * ) Notice: Subject to any disclaimer, the term of this patent is extended or adjusted under 35 U.S.C. 154(b) by 0 days.

(21) Appl. No.: 10/899,465

(22) Filed: Jul. 26, 2004

(51) Int. Cl.[7] .............................................. B65G 23/14
(52) U.S. Cl. ...................................................... 198/833
(58) Field of Search ........................................ 198/833

(56) References Cited

U.S. PATENT DOCUMENTS

| | | | | |
|---|---|---|---|---|
| 1,626,041 A | * | 4/1927 | Gordon et al. .............. | 198/825 |
| 1,903,488 A | * | 4/1933 | Stibbs ......................... | 198/687 |
| 2,759,595 A | * | 8/1956 | Lauenstein .................. | 198/830 |
| 2,863,555 A | * | 12/1958 | Jaritz .......................... | 198/833 |
| 3,858,473 A | * | 1/1975 | Bystron ....................... | 83/401 |
| 3,967,720 A | * | 7/1976 | Arieh .......................... | 198/833 |
| 3,994,390 A | * | 11/1976 | Peterson et al. ............ | 198/833 |
| 4,058,204 A | * | 11/1977 | Arieh .......................... | 198/833 |
| 4,863,010 A | * | 9/1989 | Proksa et al. ............ | 198/626.1 |
| 5,103,968 A | * | 4/1992 | Skarlupka .................... | 198/833 |
| 5,415,274 A | * | 5/1995 | Krismanth et al. ......... | 198/833 |
| 5,630,500 A | * | 5/1997 | Conrad ....................... | 198/833 |
| 6,758,323 B2 | * | 7/2004 | Costanzo ............... | 198/457.02 |

* cited by examiner

*Primary Examiner*—Richard Ridley
(74) *Attorney, Agent, or Firm*—Sommer Barnard Attorneys, PC

(57) ABSTRACT

A crossover conveyor system that allows people to safely cross over a portion of a conveyor line is disclosed. The crossover conveyor system includes a frame that has at least a first side member and a second side member. A plurality of rollers may be connected between the first and second side members. A first and second drive shaft may be connected between the first and second side members at opposing ends of the frame. At least one endless belt extends or wraps around an upper surface of the frame, the rollers and the first and second drive shaft. A drive belt may be connected with a drive mechanism. Pressure rollers are included for constantly applying pressure to the drive belt or selectively applying pressure to the drive belt. The drive belt is located between the endless belt and the pressure rollers such that when the drive mechanism rotates the drive belt and the endless belt rotates.

35 Claims, 7 Drawing Sheets

CROSSOVER CONVEYOR SYSTEM

BACKGROUND OF THE INVENTION

1. Technical Field

The present invention relates generally to conveyor systems, and more particularly, to a crossover conveyor system that provides a safety walkway that may be installed in at least a portion of a conveyor line.

2. Related Art

A conveyor is a mechanical apparatus that is used to move articles or bulk material from place to place. Conveyors are used in a wide variety of industrial and commercial settings to move numerous types of materials. Often, several individual conveyor modules or units are connected together to form a large conveyor line. This allows the materials being transported to travel great distances without the need of being picked up and physically moved.

Injuries resulting from the use of conveyors cost employers millions of dollars each year. The U.S. Department of Labor, Bureau of Labor Statistics, has recently reported that over 50 workplace fatalities a year occur where conveyors are the primary source of injury. According to a leading industry insurance company, these workplace injuries account for approximately 25 percent of all workers' compensation claims and up to 35 percent of all associated costs. As a result, conveyor safety is a critical factor in any material handling operation.

One basic type of conveyor is a roller conveyor in which rollers are used to move an article from place to place. Another basic type of conveyor is a belt conveyor in which a belt is used to move articles from place to place. If the conveyors are not manually or gravity operated, the rollers or belts of the conveyors may be driven by an electric motor, a hydraulic motor, or any other conventional drive mechanism. The electric motor causes the rollers or belt to move which in turn, causes the articles to travel down the conveyor line.

A roller conveyor generally includes a frame that has a plurality of rollers longitudinally spaced along the length of the conveyor. The rollers are used to move the materials down the conveyor line. An electric or hydraulic motor may be connected with a drive pulley that is used to drive a drive belt that is connected with the drive pulley. The drive belt may be connected with end pulleys that are located at both ends of the conveyor. The drive belt may also be thread between the rollers and a plurality of pressure rollers. The pressure rollers are used to apply pressure to the underside of the drive belt thereby forcing the rollers to rotate when the drive belt is driven by the electric motor.

A basic belt conveyor includes a frame that is designed to allow a belt to rotate around the frame. In some belt conveyors, the frame may include rollers that the belt rests on top of and in other belt conveyors the belt may simply rotate on a flat surface of the frame. The belt may be connected with end pulleys and one or both of the end pulleys may be connected with an electric motor. When the motor is operational, the belt rotates around the end pulleys thereby allowing materials to travel down the conveyor.

Both of the conveyors discussed above have safety issues and concerns surrounding workers attempting to cross over the conveyor line. Some conveyors can be several feet wide and this requires workers to take one or more steps on the actual rollers or belts to get across. In the case of a roller conveyor, the rollers may rotate with the pressure of a person's foot thereby causing the worker to lose their balance and fall. The conveyor may also start-up while the worker is on it, which could cause the worker to lose their balance and fall because the rollers or belt began to rotate.

A known method of allowing a worker to cross a roller conveyor line is by the placement of a longitudinal gap between the rollers in which a narrow plate is longitudinally positioned in the gap. The worker can carefully attempt to get across the conveyor using the narrow plate, but still a risk of falling exists because the plate is often very narrow in width. If the width of the plate is too large, the material to be conveyed may get hung up. Another conventional method of allowing a worker to cross a conveyor line is by the placement of island plates ("lily pads") across the width of the conveyor. The island plates require a worker to carefully step from island plate to island plate to get across the conveyor. The island plates are also fairly narrow, which could also cause the worker to fall.

As a result of the aforementioned problems, a need exists for a conveyor system that is capable of providing a safe and efficient way to cross conveyor lines thereby reducing the number of injuries that are associated with conveyors.

SUMMARY

One embodiment of the present invention discloses a crossover conveyor system that may be installed in a roller conveyor system, such as a power live roller conveyor system. The crossover conveyor system may be installed in other conveyor systems as well, such as a belt conveyor system. The present invention solves the aforementioned problems of the current practices by providing a safe and efficient method for individuals to cross conveyor lines without the risk of falling and getting injured. In addition to providing a relatively large flat surface for the individuals to walk across the conveyor line, the present invention also provides a user interface that allows individuals to stop an endless belt of the crossover conveyor from rotating as well as lights that can inform the individual as to whether or not it is safe to cross.

The crossover conveyor system may include a frame that has at least a first side member and a second side member. A plurality of rollers may be connected between the first and second side members of the frame. At least one endless belt extends around an upper surface of the frame and the rollers. A drive belt may be connected with a drive mechanism. A plurality of pressure rollers is included for applying pressure to the drive belt. The drive belt is positioned between the endless belt and the pressure rollers such that when the drive mechanism rotates the drive belt; it causes the endless belt to rotate. The preferred crossover conveyor system includes three endless belts, but various numbers of endless belts may be used in alternative embodiments.

The crossover conveyor system may also include a pair of drive shafts that are connected at opposite ends of the frame. The drive shafts may include at least one sprocket that has a plurality of teeth. The teeth engage notches located on the lower surface of the endless belt. The drive belt that rotates the endless belt may only make contact with one of the endless belts. As such, the drive shaft will cause the endless belts that are not in contact with the drive belt to rotate as well.

A control unit may be provided that is connected with the drive mechanism and a user interface unit. The control unit is capable of turning the drive mechanism on and off at appropriate times. The user interface unit may include a stop and start mechanism, such as buttons, that allow people to control operation of the endless belt. If a person desires to cross the crossover conveyor system, they may press the stop mechanism and the control unit will not allow the endless belt to be engaged for a predetermined amount of time or can stop the endless belt if it is already rotating. Once the person crosses, they may press the start mechanism, which will allow the endless belt to begin rotating when needed or resume rotation if it was previously rotating when stopped by the user interrupt.

Another embodiment of the present invention discloses a crossover conveyor system for a power roller conveyor system. The crossover conveyor system includes a frame having a first side member and a second side member. A plurality of rollers may be connected between the first and second side members. At least one endless belt may extend around an upper surface of the frame and the rollers. A drive belt may be connected with a drive mechanism. The drive belt is preferentially located below the endless belt. A pressure tray may be located below the drive belt. A pressure tray lifting mechanism may be connected with the pressure tray for selectively raising the pressure tray such that the drive belt engages the endless belt. The endless belt rotates when the drive belt is engaged with the endless belt and the drive belt is being rotated by the drive mechanism.

Yet another embodiment of the present invention discloses a crossover conveyor module installed in a roller conveyor system. The crossover conveyor module includes a crossover conveyor frame having at least a first side member and a second side member. A plurality of crossover conveyor rollers may be connected between the first and second side members. At least one endless belt extends around an upper surface of the frame and the crossover conveyor rollers. A roller conveyor frame may be provided that includes a third side member and a fourth side member. The crossover conveyor frame is positioned in the roller conveyor frame between the third side member and the fourth side member.

A plurality of load carrying rollers may be connected between the third side member and the fourth side member of the roller conveyor frame. A plurality of pressure rollers may be positioned below the endless belt of the crossover conveyor frame and the load carrying rollers of the roller conveyor frame. A drive belt may be connected with a drive mechanism, wherein the drive belt is positioned between the load carrying rollers and the pressure rollers as well as the endless belt and the pressure rollers. The drive belt is capable of rotating the endless belt because when the drive belt rotates it forces the endless belt to rotate as well.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
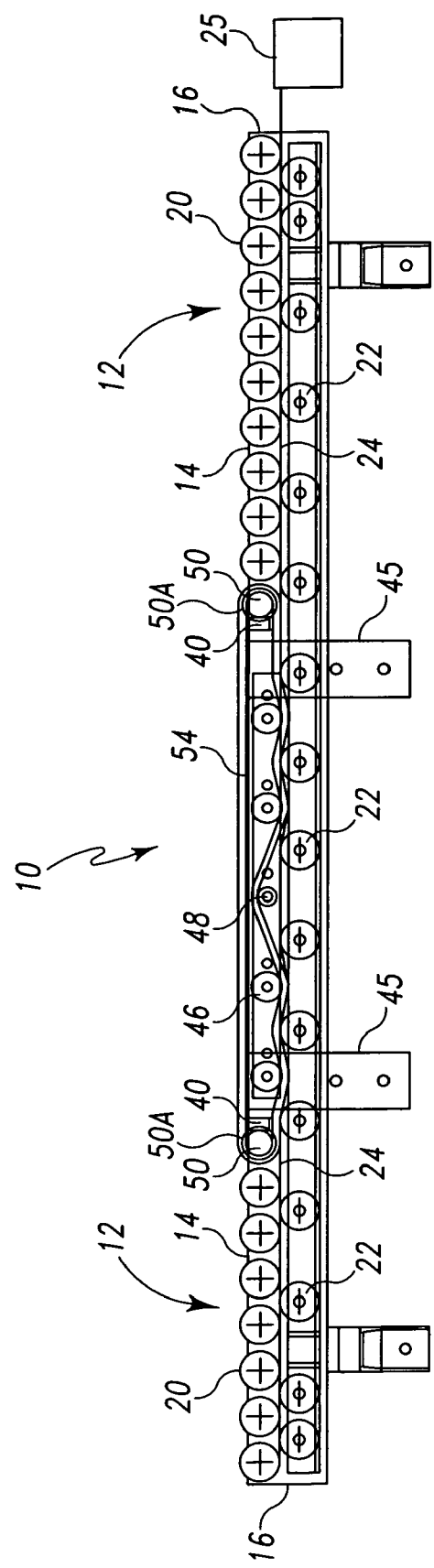
FIG. 1 is a cross-sectional side view of a crossover conveyor system positioned in a power live roller conveyor system.

Referring to FIG. 1, a cross-sectional side view of a crossover conveyor system 10 installed in a power live roller conveyor system 12 is illustrated. The crossover conveyor system 10 may be designed as a module that may be placed in an existing conveyor line or it may be incorporated as part of a new conveyor line. The crossover conveyor system 10 provides a safe and efficient way for workers to cross conveyor lines thereby reducing the number of injuries that are associated with conveyors and the distance that workers need to travel to cross conveyor lines.

Figure 2:
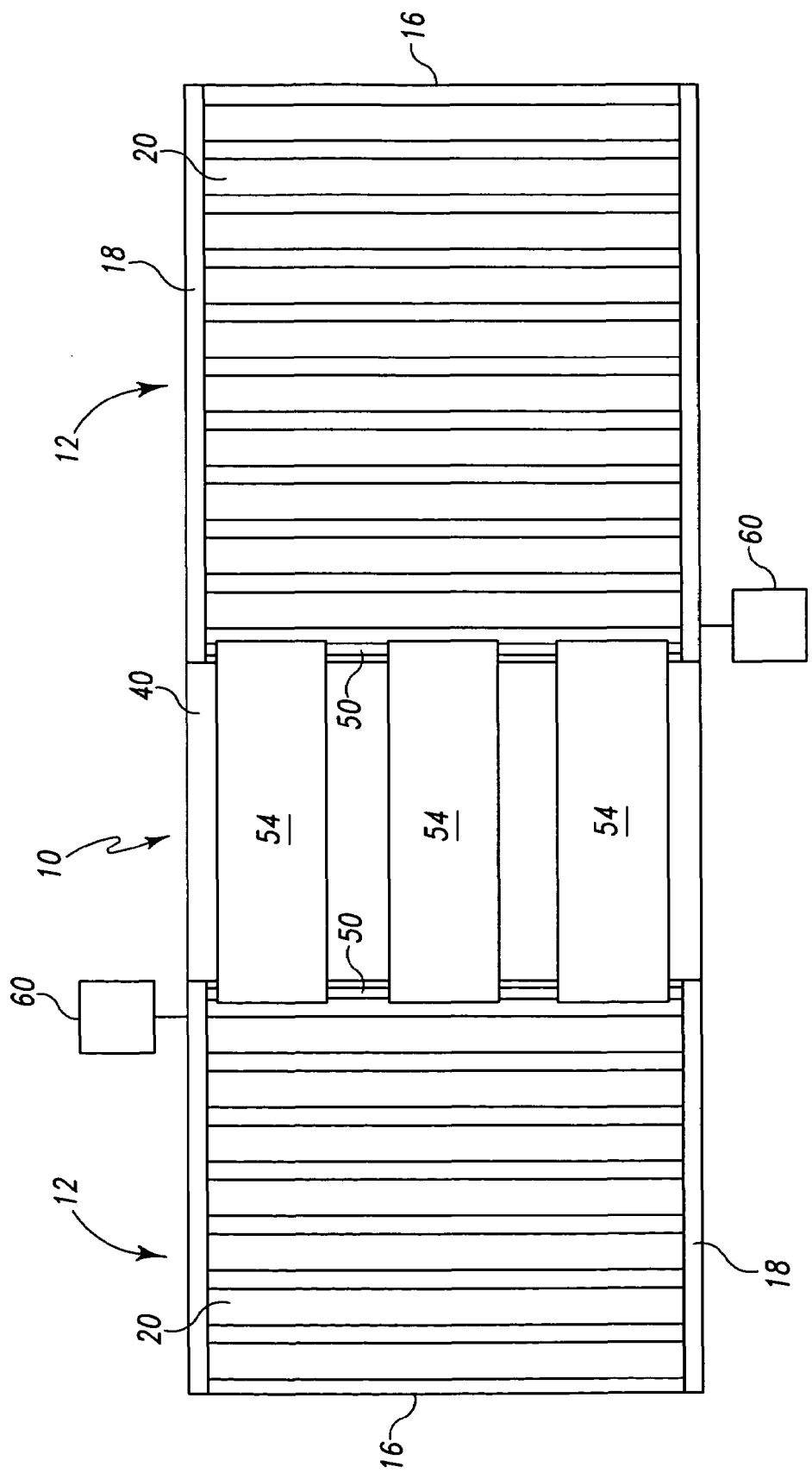
FIG. 2 is a top view of the crossover conveyor system illustrated in FIG. 1.

The power live roller conveyor system 12 may include a frame 14 that may extend lengthwise a predetermined distance and have a predetermined width. Referring to FIG. 2, which illustrates a top view of the crossover conveyor system 10 installed in the power live roller conveyor system 12, the frame 14 may include a pair of end members 16 and a pair of side members 18. For the purpose of the present invention, it is important to note that the length and width of the crossover conveyor system 10 and the power live roller conveyor system 12 may be adjusted according to the nature of articles that need to be transported on the power live roller conveyor system 12. As such, the shape of the crossover conveyor system 10 illustrated throughout the various figures should be viewed as illustrative only and not in a restrictive sense unless otherwise claimed as such.

As illustrated in FIG. 2, a plurality of load carrying rollers 20 may be connected with the frame 14 between the side members 18 of the frame 14. The load carrying rollers 20 are used to move articles that need to be transported on the power live roller conveyor system 12. Although not specifically illustrated, the load carrying rollers 20 may be connected to each respective side member 18 of the frame 14 via a bearing assembly or some other type of assembly that allows the load carrying rollers 20 to rotate about a horizontal plane. In addition, the load carrying rollers 20 may be connected with the side members 18 of the frame 14 such that they may easily be removed and replaced in the frame 14. For the purpose of the present invention, it is important to note that the load carrying rollers 20 are capable of rotating when driven by an external force, thereby transporting an article that needs to be moved on the power live roller conveyor system 12.

Referring back to FIG. 1, the power live roller conveyor system 12 may also include a plurality of pressure rollers 22 that may be connected with the frame 14 and positioned below the load carrying rollers 20. The power live roller conveyor system 12 may also include a drive belt 24 that may be located or sandwiched between the load carrying rollers 20 and the pressure rollers 22. The drive belt 24 may be connected with a drive mechanism 25 that is used to rotate the drive belt 24. The drive mechanism 25 may consist of one or more motors, electric motors, pneumatic motors or any other type of suitable device or system, as commonly known in the art, that is capable of rotating the drive belt 24. The drive mechanism 25 may be connected with a drive roller or any other similar type of arrangement that allows the drive mechanism to rotate the drive belt 24. For the purpose of the present invention, it is important to note that the drive mechanism 25 is capable of rotating the drive belt 24 so that when the drive belt 24 is in contact with the load carrying rollers 20 the drive belt 24 causes the load carrying rollers 20 to rotate about their horizontal axis.

Although not illustrated, those skilled in the art would recognize that the drive belt 24 may also be connected with a return mechanism, such as an end pulley or end roller for example, that allows the drive belt 20 to rotate as an endless belt along the conveyor line. The pressure rollers 22 apply upward pressure to the drive belt 24, thereby forcing the drive belt 24 into contact with the load carrying rollers 20. As such, when the drive mechanism is operational, the drive belt 24 causes the load carrying rollers 20 to rotate, thereby allowing an article or object to be moved in a predetermined direction along the power live roller conveyor system 12.

Figure 3:
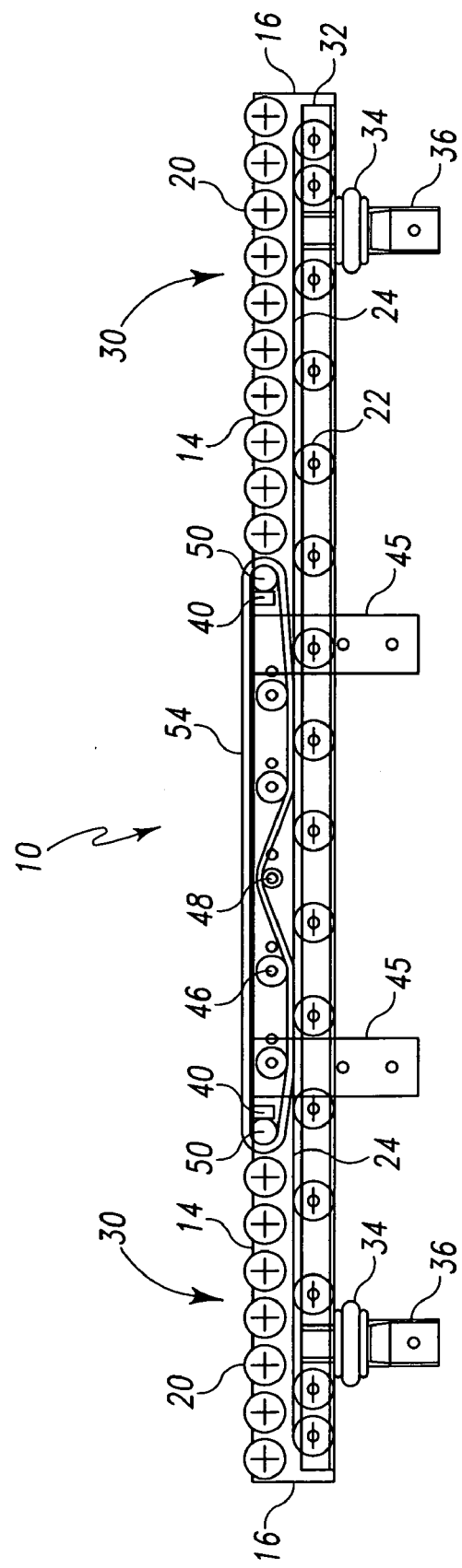
FIG. 3 is a cross-sectional side view of a crossover conveyor system positioned in an accumulating roller conveyor system in a lowered state.

Referring to FIG. 3, wherein like numbered elements refer to common elements throughout the various figures, an accumulating roller conveyor system 30 is illustrated that includes a pressure roller tray 32. The pressure roller tray 32 may be designed to fit within an inside perimeter of the frame 14 of the accumulating roller conveyor system 30. In this embodiment, the pressure rollers 22 may be connected with sidewall members of the pressure roller tray 32. The pressure rollers 22 may be connected in such a way that they rotate about their horizontal axis. A pressure roller tray lifting mechanism 34 may be connected with the pressure roller tray 32. The pressure roller tray lifting mechanism 34 may be connected with a base support 36 that elevates the pressure tray 32 off of the ground a predetermined distance. In the embodiment illustrated in FIG. 3, the pressure roller tray lifting mechanism 34 comprises an air bag, but other devices, such as air cylinders or pneumatic cylinders for example, may be used as well.

Figure 4:
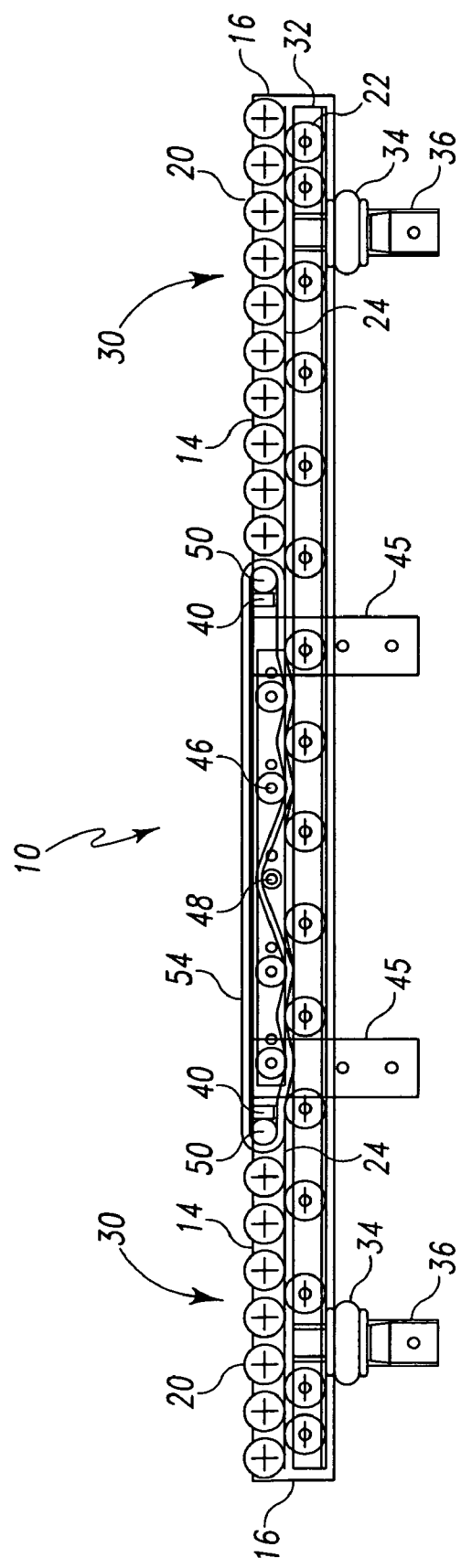
FIG. 4 is a cross-sectional side view of a crossover conveyor system positioned in an accumulating roller conveyor system in a raised state.

As illustrated in FIG. 3, the pressure roller tray lifting mechanism 34 is shown in a deflated or retracted state. As such, even if the drive belt 24 is being rotated by the drive mechanism, the load carrying rollers 20 will not rotate because the drive belt 24 is not in contact with the load carrying rollers 20. Referring to FIG. 4, during operation the pressure roller tray lifting mechanism 34 is used to lift the pressure rollers 22 up so that the drive belt 24 makes contact with the load carrying rollers 20. Once the pressure rollers 22 force the drive belt 24 to make sufficient contact with the load carrying rollers 20, they begin to rotate if the drive mechanism is driving or rotating the drive belt 24. As set forth above, when the pressure roller tray lifting mechanism 34 is not in a lifted state, the drive belt 24 is not in contact with the load carrying rollers 20 and as a result, the load carrying rollers 20 do not rotate.

Referring back to FIG. 1, in this embodiment of the present invention the drive mechanism that rotates the drive belt 24 may be turned on or engaged only when an article needs to be moved on a particular section of the power live roller conveyor system 12. As such, the crossover conveyor system 10 will only be activated when the drive belt 24 is being driven by the drive mechanism. If the drive belt 24 is not rotating, the load carrying rollers 20 of the power live roller conveyor system 12 and the endless belts 54 of the crossover conveyor system 10 will not rotate.

As briefly set forth above, the crossover conveyor system 10 may be designed to be installed in existing conveyor lines or may be designed as part of a new conveyor line. Referring to FIGS. 1–5, the crossover conveyor system 10 may include a frame 40 that may have a pair of sidewalls 42 and an upper surface 44. In addition, the frame 40 may include a plurality of legs 45 operative to support the frame 40. The frame 40 may include a plurality of rollers 46 that may be connected with the sidewalls 42 of the frame section 40. The crossover conveyor system 10 may also include a guide roller 48 that may be connected with the sidewalls 42 of the frame section 40. A pair of drive shafts 50 may also be located at each respective end of the frame 40. The rollers 46, the guide roller 48 and the drive shafts 50 may extend horizontally across almost the entire width of the frame 40 or they may be shortened to only extend a predetermined distance across the width of the frame 40. In addition, multiple sets of rollers 46, guide rollers 48 and drive shafts 50 may be used that are smaller in width instead of a longer roller or drive shaft.

Figure 5:
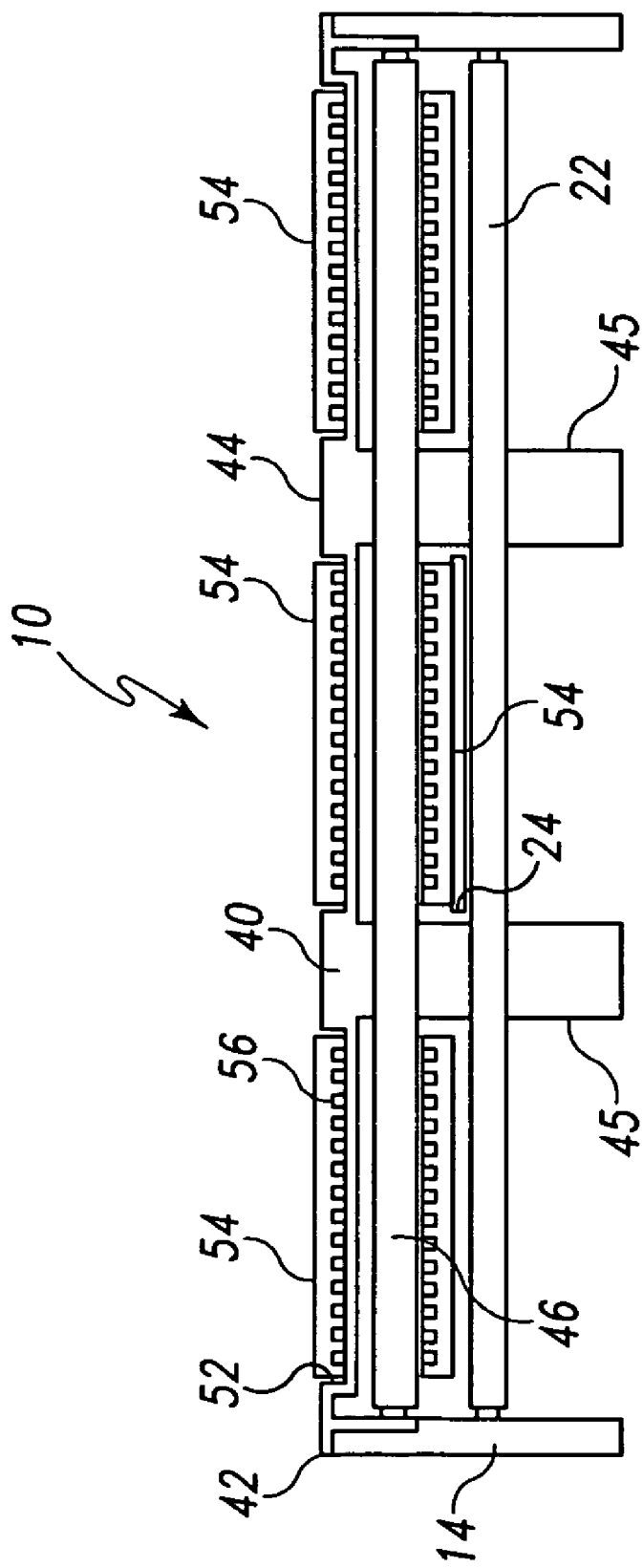
FIG. 5 is a cross-sectional front view of the crossover conveyor system illustrated in FIG. 1.

Referring to FIG. 5, which illustrates a cross-sectional view of a portion of the crossover conveyor system 10 illustrated in FIG. 1, the frame 40 may include at least one travel guide or notch 52. The travel guides 52 allow at least one endless belt 54 that may be wrapped around the drive shafts 50, the rollers 46 and the guide roller 48 to travel on an upper surface 44 of the frame 40. As illustrated, the travel guides 52 may be somewhat shorter in height than the endless belt 54 so that the upper surface of the endless belt 54 sticks up somewhat higher than the upper surface 44 of the frame 40. The depiction of the shape of the frame 40 of the crossover conveyor system 10 and the frame 14 of the power live roller conveyor system 12 illustrated in FIG. 5 should be viewed in an illustrative sense and should not be construed as a limitation of the present invention. The frames 14 and 40 may be manufactured in various shapes depending upon the desired application.

Referring collectively to FIGS. 1, 2 and 5, as the drive belt 24 of the power live roller conveyor system 12 is operational or rotating, the pressure rollers 22 are applying pressure to the drive belt 24 and at least one endless belt 54 of the crossover conveyor system 10. As a result, the endless belts 54 of the crossover conveyor system 10 also rotate, thereby allowing an article to move across the top of the endless belts 54 until the article reaches the load carrying rollers 20 of the power live roller conveyor system 12. Once the article reaches the load carrying rollers 20, the power live roller conveyor system 12 transports the article off of the crossover conveyor system 10 and back onto the power live roller conveyor system 12.

The endless belts 54 of the crossover conveyor system 10 may include a plurality of notches 56 that are located on the lower surface of the endless belts 54. Although not specifically illustrated, the notches 56 may fit in sprockets 50a that may be located on or connected with the drive shaft 50 of the crossover conveyor system 10. The sprockets 50a may include a plurality of teeth that fit within the notches 56 of the endless belts 54 as commonly known in the art. The sprockets 50a of the drive shaft 50 are included to assist in the rotation of the endless belts 54 around the crossover conveyor system 10. In particular, since the drive belt 24 of the power live roller conveyor system 12 is only driving one endless belt 54 in the illustrated embodiments, the drive shaft 50 will cause the endless belts 54 that are not being directly driven by the drive belt 24 to rotate as well. As set forth in detail above, the drive belt 24 of the power live roller conveyor system 12 provides the force that drives the endless belts 54 of the crossover conveyor system 10.

Referring to FIGS. 3 and 4, in this embodiment of the present invention, the crossover conveyor system 10 operates similar in manner to that described in relation to FIG. 1. However, in this embodiment, the endless belts 54 of the crossover conveyor system 10 only rotate when the pressure tray 32 is raised so that the drive belt 24 engages at least one of the endless belts 54. As such, when the pressure tray lifting mechanism 34 is not raising the pressure tray 32 to force the drive belt 24 to make contact with at least one of the endless belts 54, the endless belts 54 do not rotate. When the pressure tray lifting mechanism 34 has the pressure tray 32 in a raised state, the endless belts 54 of the crossover conveyor system 10 are capable of rotating if the drive mechanism is rotating the drive belt 24.

Referring to FIG. 2, the crossover conveyor system 10 may include a pair of user interface units 60. Although not specifically illustrated, the crossover conveyor system 10 may also include a control unit, which may consist of a microprocessor, a programmable logic controller or any other equivalent device. The user interface units 60 and the drive mechanism may be connected with the control unit. The user interface units 60 may include a stop mechanism that allows a person to safely ensure that the endless belts 54 do not start rotating while they are crossing the crossover conveyor system 10. When the stop mechanism is pressed, a signal is sent to the control unit that does not allow the endless belts 54 of the crossover conveyor system 10 to rotate for a predetermined amount of time, thereby allowing the person to safely walk across the crossover conveyor system 10. The user interface units 60 may also include a start mechanism so that the person may press the start mechanism after crossing the crossover conveyor system 10 to indicate to the control unit that it is safe to rotate the endless belts 54.

Although not specifically illustrated, the crossover conveyor system 10 may also include a plurality of lights that may be connected with the control unit. As an example, a red light may be lit to indicate that it is not safe for a person to cross the crossover conveyor system 10. A green light may be lit to indicate that it is safe for the person to cross the crossover conveyor system 10. Finally, an orange or yellow light may be lit to indicate to the person that the crossover conveyor system 10 is getting ready to start the endless belts 54 in a predetermined amount of time. The color of the lights may vary in different embodiments of the invention and as such, the color indications set forth above should be viewed as illustrative and not as a limitation of the present invention. In addition, the lights may be replaced with a display system that is capable of informing the person of the status of the crossover conveyor system 10.

Figure 6:
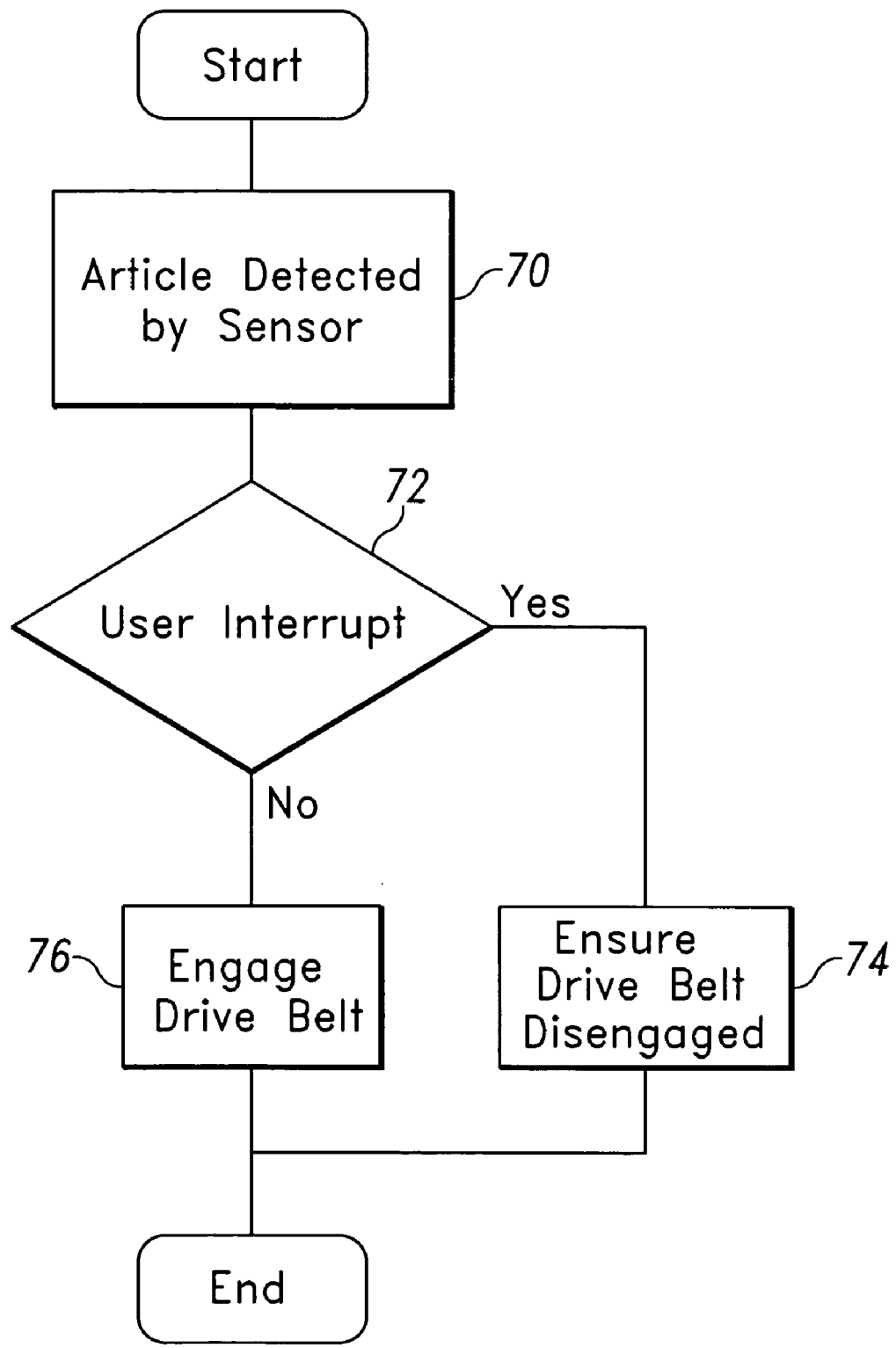
FIG. 6 is a flow chart illustrating how the control unit may control the crossover conveyor system.

Referring to FIG. 6, an illustrative example of how the control unit may operate the crossover conveyor system 10 in the accumulating roller conveyor system 30 illustrated in FIGS. 3 and 4 is set forth. As an article to be transported reaches the accumulating roller conveyor system 30, at least one sensor (not illustrated) along the conveyor line may inform the control unit that an article is approaching that needs to be moved down the line, which is represented at step 70. The control unit will then determine if a user interrupt has occurred, which is represented at step 72. A user interrupt may occur if a person that desires to cross the crossover conveyor system 10 has pressed the stop button on a respective user interface unit 60.

If a person has caused a user interrupt at step 74, the control unit ensures that the drive belt 24 is disengaged from the endless belt 54 of the crossover conveyor system 10; thereby ensuring that the endless belts 54 are not rotating or do not begin to rotate. In the embodiments illustrated in FIGS. 3 and 4, the control unit will ensure that the pressure tray lifting mechanism 34 is not in a raised state which keeps the drive belt 24 from engaging the endless belt 54 of the crossover conveyor system 10. If a user interrupt has not occurred at step 76, the control unit may start the drive mechanism that drives the drive belt 24 and raise the pressure tray 32, so that the drive belt 24 will engage the endless belts 54 of the crossover conveyor system 10; thereby causing the endless belt 54 to begin to rotate. If at any time a user interrupt occurs, for example, by the stop button being pressed on a respective user interface unit 60, the endless belts 54 will stop rotating to allow a person to safely cross the crossover conveyor system 10.

In the embodiment illustrated in FIG. 1, the drive belt 24 is continuously in contact with the load carrying rollers 20. As such, when the drive mechanism that rotates the drive belt 24 is operational, the load carrying rollers 20 are rotating. Likewise, in this embodiment of the present invention, the drive belt 24 is also continuously in contact with at least one endless belt 54 of the crossover conveyor system 10. When the drive mechanism that rotates the drive belt 24 is operational, the endless belts 54 of the crossover conveyor system 10 are also rotating. If a user interrupt occurs in this particular embodiment, the control unit may stop the drive mechanism, thereby stopping the drive belt or ensure that the drive mechanism does not start for a predetermined amount of time or until the start button is pressed on a respective user interface unit 60.

Figure 7:
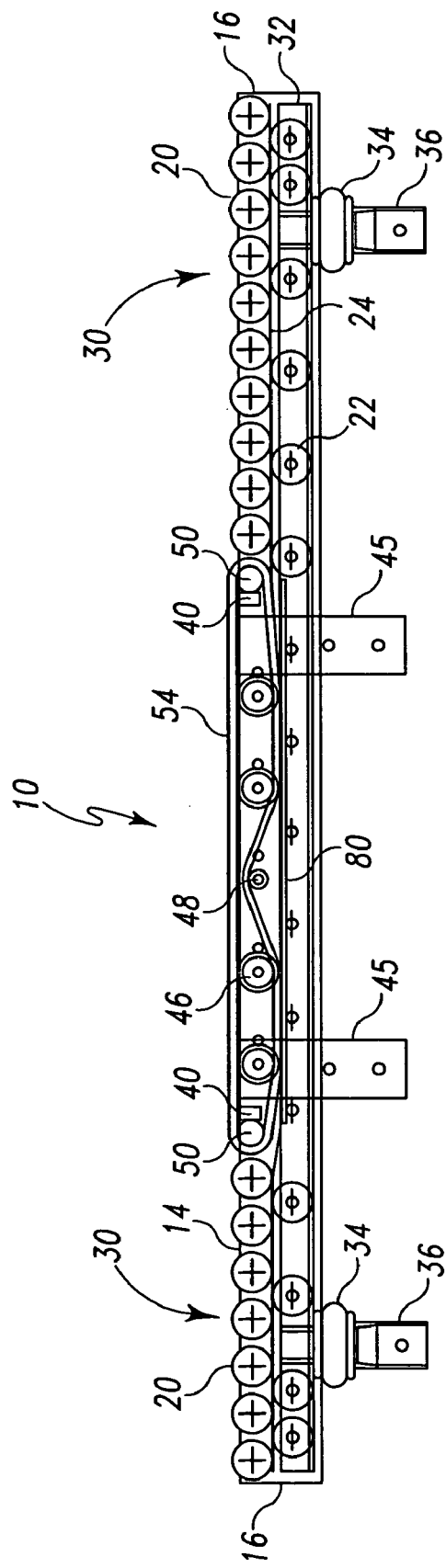
FIG. 7 is a cross-sectional side view of a crossover conveyor system positioned in an accumulating roller conveyor system that includes a slide plate.

Referring to FIG. 7, the crossover conveyor system 10 may also be designed for use with a slide plate 80. In this illustrated embodiment, the slide plate 80 may be connected with the pressure roller tray 32. The slide plate 80 is used to apply upward force or pressure to the drive belt 24, thereby forcing the drive belt 24 into contact with the endless belt 54 of the crossover conveyor system 10. The slide plate 80 may be made from any type of suitable material, such as plastic, fiberglass, aluminum, steel and so forth, but in the preferred embodiment the slide plate 80 is made from ultra high molecular weight polyethylene ("UMHW").

In the embodiment illustrated in FIG. 7, the slide plate 80 is positioned below the endless belt 54 of the crossover conveyor system 10. As such, when the pressure roller tray lifting mechanism 34 raises the pressure roller tray 32, the slide plate 80 makes contact with the drive belt 24 which in turn, makes contact with the endless belt 54 of the crossover conveyor system 10. When the drive belt 24 is rotating, the friction or contact made between the drive belt 24 and the endless belt 54 causes the endless belt 54 of the crossover conveyor system 10 to rotate as well. The slide plate 80 is illustrated in FIG. 7 as part of the accumulating roller conveyor system 30; however those skilled in the art should recognize that the slide plate 80 may also be used in other embodiments of the present invention as well.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A crossover conveyor system, comprising:
   a frame including at least a first side member and a second side member;
   a plurality of rollers positioned between the first and second side members;

at least one endless belt extending around an upper surface of the frame and the rollers, wherein at least a portion of a lower surface of the at least one endless belt makes contact with at least a portion of the upper surface of the frame;

a drive belt connected with a drive mechanism;

a plurality of pressure rollers for applying pressure to the drive belt; and wherein the drive belt is positioned between the endless belt and the pressure rollers, wherein rotation of the drive belt by the drive mechanism causes rotation of the endless belt.

2. The crossover conveyor system of claim 1, wherein the frame further includes a plurality of legs.

3. The crossover conveyor system of claim 1, further comprising a first and second drive shaft connected between the first and second side members at opposing ends of the frame, wherein the endless belt extends around the first and second drive shafts.

4. The crossover conveyor system of claim 3, wherein the drive shafts include at least one sprocket having a plurality of teeth that engage at least one notch of the endless belt.

5. The crossover conveyor system of claim 1, further comprising a control unit connected with a user interface unit.

6. The crossover conveyor system of claim 5, wherein the user interface unit includes a stop mechanism that stops rotation of the endless belt.

7. The crossover conveyor system of claim 5, wherein the user interface unit includes a start mechanism capable of informing the control unit that it is safe to start rotation of the endless belt.

8. The crossover conveyor system of claim 1, wherein the upper surface of the frame includes a recessed portion, wherein the endless belt fits within the recessed portion such that a minimal portion of the endless belt protrudes above the upper surface of the frame for making contact with an article to be moved.

9. A crossover conveyor system, comprising:
a frame including at least a first side member and a second side member;
a plurality of rollers positioned between the first and second side members;
at least one endless belt extending around an upper surface of the frame and the rollers;
a drive belt connected with a drive mechanism, wherein the drive belt is positioned below the endless belt;
a pressure tray positioned below the drive belt; and
a pressure tray lifting mechanism connected with the pressure tray for selectively raising the pressure tray such that the drive belt makes contact with the endless belt thereby causing the endless belt to rotate when the drive belt is being driven by the drive mechanism.

10. The crossover conveyor system of claim 9, wherein the frame further includes a plurality of legs.

11. The crossover conveyor system of claim 9, further comprising a first and second drive shaft connected between the first and second side members at opposing ends of the frame, wherein the endless belt extends around the first and second drive shafts.

12. The crossover conveyor system of claim 11, wherein the drive shafts include a sprocket having a plurality of teeth that engage at least one notch of the endless belt.

13. The crossover conveyor system of claim 9, further comprising a control unit connected with a user interface unit.

14. The crossover conveyor system of claim 13, wherein the user interface unit includes a stop mechanism capable of stopping rotation of the endless belt.

15. The crossover conveyor system of claim 13, wherein the user interface unit includes a start mechanism capable of informing the control unit that it is safe to start rotation of the endless belt.

16. The crossover conveyor system of claim 9, wherein the upper surface of the frame includes a recessed portion, wherein the endless belt fits within the recessed portion such that a minimal portion of the endless belt protrudes above the upper surface of the frame for making contact with an article to be moved.

17. The crossover conveyor system of claim 9, wherein the pressure tray lifting mechanism comprises an air bag.

18. A crossover conveyor module in a roller conveyor system, comprising:
a crossover conveyor frame including at least a first side member and a second side member;
a plurality of crossover conveyor rollers positioned between the first and second side members;
an endless belt extending around an upper surface of the crossover conveyor frame and the crossover conveyor rollers;
a roller conveyor frame including a third side member and a fourth side member, wherein the crossover conveyor frame is positioned between the third side member and the fourth side member of the roller conveyor frame;
a plurality of load carrying rollers connected between the third side member and the fourth side member of the roller conveyor frame;
a plurality of pressure rollers positioned below the endless belt of the crossover conveyor frame and the load carrying rollers of the roller conveyor frame; and
a drive belt connected with a drive mechanism, wherein the drive belt is positioned between the load carrying rollers and the pressure rollers, wherein the drive belt is further positioned between the endless belt and the pressure rollers.

19. The crossover conveyor module for a roller conveyor system of claim 18, wherein the drive mechanism rotates the drive belt thereby causing rotation of the load carrying rollers and the endless belt.

20. The crossover conveyor module for a roller conveyor system of claim 18, further comprising a pressure roller tray, wherein the pressure rollers are connected with the pressure roller tray.

21. The crossover conveyor module for a roller conveyor system of claim 20, further comprising a pressure roller tray lifting mechanism connected with the pressure roller tray.

22. The crossover conveyor module for a roller conveyor system of claim 21, wherein the pressure roller tray lifting mechanism selectively raises the pressure roller tray such that the drive belt makes contact with the load carrying rollers and the endless belt thereby causing the load carrying rollers and the endless belt to rotate when the drive belt is being driven by the drive mechanism.

23. The crossover conveyor module for a roller conveyor system of claim 18, further comprising a first and second drive shaft connected between the first and second side members at opposing ends of the crossover conveyor frame, wherein the endless belt extends around the first and second drive shafts.

24. The crossover conveyor module for a roller conveyor system of claim 23, wherein the drive shafts include a sprocket having a plurality of teeth that engage at least one notch of the endless belt.

25. The crossover conveyor module for a roller conveyor system of claim 18, further comprising a control unit connected with a user interface unit.

26. The crossover conveyor module for a roller conveyor system of claim 25, wherein the user interface unit includes a stop mechanism capable of stopping rotation of the endless belt.

27. The crossover conveyor module for a roller conveyor system of claim 25, wherein the user interface unit includes a start mechanism capable of informing the control unit that it is safe to start rotation of the endless belt.

28. The crossover conveyor module for a roller conveyor system of claim 18, further comprising a first and second drive shaft connected between the first and second side members at opposing ends of the crossover conveyor frame, wherein the endless belt, a second endless belt and a third endless belt extend around the first and second drive shafts, wherein the second and third endless belts are rotated by the drive shafts while the drive belt is rotated by the drive mechanism.

29. A crossover conveyor system, comprising:
a frame including at least a first side member and a second side member;
a plurality of rollers connected between the first and second side members;
at least one endless belt extending around an upper surface of the frame and the rollers;
a drive belt connected with a drive mechanism;
a slide plate for applying pressure to the drive belt such that the drive belt makes contact with the endless belt; and
wherein the drive belt is positioned between the endless belt and the slide plate, wherein rotation of the drive belt by the drive mechanism causes rotation of the endless belt.

30. A crossover conveyor system, comprising:
a plurality of rollers connected between a first side member and a second side member of a frame;
at least one endless belt extending around an upper surface of the frame and the rollers, wherein at least a portion of a lower surface of the at least one endless belt makes contact with at least a portion of the upper surface of the frame;
means for rotating a drive belt positioned below at least a portion of the endless belt; and
means for forcing the drive belt to make contact with the at least one endless belt thereby causing the at least one endless belt to rotate when the drive belt is rotating.

31. The crossover conveyor system of claim 30, wherein the means for forcing the drive belt to make contact with the at least one endless belt comprises a slide plate.

32. The crossover conveyor system of claim 30, wherein the means for forcing the drive belt to make contact with the at least one endless belt comprises at least one pressure roller.

33. The crossover conveyor system of claim 32, wherein the at least one pressure roller is positioned in a pressure roller tray.

34. The crossover conveyor system of claim 33, wherein the pressure roller tray is connected with a pressure roller tray lifting mechanism that raises the pressure roller tray so that the at least one pressure roller makes contact with the drive belt.

35. A crossover conveyor system, comprising:
a frame including at least a first side member and a second side member;
a plurality of rollers positioned between the first and second side members;
at least one endless belt extending around an upper surface of the frame and the rollers;
a drive belt connected with a drive mechanism;
a plurality of pressure rollers for applying pressure to the drive belt, wherein the drive belt is positioned between the endless belt and the pressure rollers, wherein rotation of the drive belt by the drive mechanism causes rotation of the endless belt; and
a first and second drive shaft connected between the first and second side members at opposing ends of the frame, wherein the endless belt extends around the first and second drive shafts, wherein the drive shafts include at least one sprocket having a plurality of teeth that engage at least one notch of the endless belt.

* * * * *